Patented Sept. 9, 1930

1,775,179

UNITED STATES PATENT OFFICE

JACOB KLEINHAUS WEIDIG, OF NEWARK, NEW JERSEY, ASSIGNOR TO THE CELLULOSE UTILITIES CORPORATION, A CORPORATION OF DELAWARE

METHOD OF PREPARING CELLULOSE-ESTER SOLUTIONS

No Drawing.    Application filed March 24, 1923.   Serial No. 627,324.

This invention relates to cellulose esters and more particularly to pyroxylin or collodion solutions.

Cellulose esters when subjected to the solvent or disintegrating or dispersing action of a suitable organic solvent yield more or less thick viscous liquids known as pyroxylin or pyroxylin solutions or collodion solutions. Among the so-called solvents commonly employed in the preparation of such pyroxylin compositions or solutions are amyl acetate, ethyl acetate, methyl-ethyl ketone, acetone, butyl acetate, etc. Other ingredients are added to impart desirable properties to the pyroxylin or to the product prepared therefrom according to the ultimate uses to which the products are to be put but the principal and essential ingredients are the cellulose ester and the solvent, the latter being usually a mixed solvent. Frequently so-called thinners are added to the pyroxylin to impart increased fluidity without the necessity of using larger quantities of the more expensive so-called active solvents. Examples of thinners are, ethyl alcohol, benzene, toluene, solvent naphtha, etc. which are most commonly used, but these thinners when used alone do not exercise any substantial solvent or disintegrating or dispersing action upon the cellulose ester.

It is true, however, that a mixed solvent formula containing both a so-called active solvent such as amyl acetate, etc., and also a so-called thinner, benzene or alcohol, etc., has a final solvent and thinning action upon cellulose ester which is comparable with, or substantially equivalent to the final action of an equal amount of pure active solvent used alone. Thus for example, a mixed solvent formula containing, say, one third to one half amyl acetate and two-thirds to one-half alcohol or benzene, or a mixture of these thinners, is known to be as good a solvent, and renders the resulting solutions equally as fluid, as a solvent of the same weight made up exclusively with amyl acetate.

The so-called thinners or diluents are sometimes used separately and sometimes in various blends or combinations. The principal function of these thinners or diluents is to render possible the more convenient manipulation of the pyroxylin in various arts where they are commonly employed, such as in the manufacture of artificial leather celluloid, water-proofed goods, lacquers, artificial silk, photographic films, and in the coating or lacquering of natural leathers, woven fabrics, paper, etc.

In the application of pyroxylin for various purposes as mentioned above, it is not only important that the solution shall be thin enough to conveniently manipulate as, for example, by means of coating machinery for applying the pyroxylin to a suitable supporting fabric as in the manufacture of artificial leather, but at the same time it is of equal importance that the pyroxylin shall have sufficient "body" or contain sufficient cellulose ester to give a film of satisfactory weight and thickness after the solvents have been evaporated. A large part of the expense in manufacturing products of this nature is due to the cost of the solvents required for dissolving the cellulose ester and for thinning or diluting the pyroxylin so as to render it sufficiently fluid for easy and convenient manipulation, particularly in connection with coating operations by means of coating machinery.

The present invention comprises an improved solution of cellulose ester which combines a working fluidity suitable to the particular use to which the solution is to be put with the maximum possible concentration of cellulose esters without deteriorating the product.

This product is made by regulated treatment of the cellulose ester solution with a basic reagent, preferably dissolved ammonia gas.

It will be understood that each industry representing a particular use or application of cellulose ester solutions has as a requirement under present conditions a particular fluidity or viscosity of the cellulose ester solution. This fluidity or viscosity is a more or less fixed requirement of the industry and everything must be adjusted more or less to this circumstance. Once having a product possessing this required viscosity, however, the present invention possesses the very great advantage that the solution contains the maximum possible concentration of cellulose ester for this viscosity, so that a film or coating of any desired thickness or weight can be produced with a minimum quantity of cellulose ester solution and with a minimum of labor and equipment required for producing the final product.

Considered from a somewhat different view point, the present invention consists in part in an improved pyroxylin product of unusually heavy "body" in the sense that it contains an unusually large proportion of cellulose ester in comparison with its high fluidity and other properties which make it easier to coat by means of machinery or otherwise manipulate in connection with the process already mentioned. In its preferred form, the improved product of the present invention is characterized not only by a relatively low viscosity and a relatively high concentration of cellulose ester, but also by the property of yielding a film having substantially the same mechanical strength, flexibility and other desirable properties as films prepared from ordinary pyroxylin.

For example, I have been able to prepare by means of my invention a high quality or non-deteriorated pyroxylin solution containing about 35 oz. of cellulose nitrate per gallon of pyroxylin and which yet has a viscosity no greater than the viscosity of an ordinary pyroxylin solution containing 22 oz. of ordinary cellulose nitrate prepared in the usual manner from ordinary cotton and ordinary mixed acid to produce an ordinary cellulose nitrate collodion cotton containing about 12% combined nitrogen. This viscosity corresponds to a viscosity of about 35 seconds at 23° C. as determined by means of the method described in Example 1, further on. The viscosity of my improved pyroxylin at concentrations of cellulose ester other than 35 oz. per gallon is lower than the viscosity of similar pyroxylin solutions hitherto known at corresponding concentrations. Thus, for example, at a concentration of about 32 ounces per gallon the viscosity of the example given was found to be 12 seconds as determined by means of the method mentioned above, and at a concentration of about 22 ounces per gallon it was about 11 seconds determined in the same manner.

At the same time films, coated fabrics and other articles prepared from this low-viscosity pyroxylin were found to be substantially as strong, flexible and otherwise generally as satisfactory as corresponding products prepared from ordinary pyroxylin.

It will thus be readily seen that by means of my invention an enormous saving is effected in the amount of solvents (including thinners) required in the production and use of pyroxylin solutions. Also, there is a corresponding saving in the cost of recovering such solvents in connection with processes in which such recovery is found to be economically advantageous.

The present invention consists also in the regulation of the amount or degree of treatment with an alkaline agent in such a way that within certain practical working limits an ordinary pyroxylin or cellulose ester solution containing a fixed number of ounces of cellulose ester per gallon can be thinned to any desired viscosity without weakening the product, that is to say the films or other products produced after removing the volatile solvent will be substantially as strong and flexible as they would have been if produced from ordinary nitrated pyroxylin solution.

It will be understood that the viscosity of pyroxylin solutions in general varies with the concentration of the cellulose ester in the pyroxylin, but it will also be understood that this variation is not in general a proportional one. In other words, it is not, as a rule, a linear or substantially linear function of the concentration of the cellulose ester so that if one plots the concentration of the cellulose ester against viscosity on rectilinear coordinates a curve and not a straight line will, in general, be obtained. It will therefore be understood that in comparing the viscosity of one pyroxylin over a wide range of concentrations with that of another type of pyroxylin over a similar range of concentration, it is usually advisable to make this comparison by plotting curves as indicated and then comparing these graphic representations of the results with each other. So, in comparing the so-called "body" and viscosity or consistency of my improved product with similar products hitherto known, such comparison is preferably made in the manner just indicated, and when this is done it will be found that the viscosity of my improved product is, in general, lower than the viscosity of the older products over a very wide range of concentrations of cellulose ester, and this is particularly true at higher ranges of concentration.

Although it would be more economical to employ in the arts, pyroxylin solutions of high concentration with respect to cellulose ester, but of low concentration as to solvents including thinners, it has hitherto been impracticable to do this because of the disproportionately great increase in the viscosity of such highly concentrated solutions of cellulose esters, which high viscosity renders pyroxylin too stiff and unworkable for application in the various arts.

Still another very important advantage of the present invention is the increased yield of finished nitrated cotton of relatively low viscosity (when dissolved in appropriate solvents) which may be produced from a given quantity of cotton. Heretofore to obtain nitrated cotton of relatively low viscosity (when dissolved) it has ordinarily been necessary to carry out the nitration under such conditions, particularly as to temperature, that objectionable by-products are formed and an appreciable proportion of the cotton is also dissolved or disintegrated by the acid to such a degree that it is lost in subsequent operations. In accordance with the present invention these disadvantages are completely overcome by carrying out the nitration under conditions as to temperature and concentration of acid, etc., which do not cause an appreciable dissolution or loss of cotton or formation of objectionable by-products and then subjecting the nitrated cotton at some stage during the subsequent operations to the action of an appropriate amount of ammonia or other suitable basic agent to bring about the desired reduction in viscosity of the product when dissolved in suitable solvents.

This treatment with a basic reagent is advantageously applied in certain instances to the nitrated cotton or other cellulose ester just prior to the packing of the product for shipment as for example in iron drums or barrels. In these instances the basic agent, preferably ammonia, may be added to the nitrated cotton or other cellulose ester just before finally sealing. By proceeding in this manner the action of the basic agent takes place to a large extent during the time in which the nitrated cotton or other cellulose ester is in transit or in storage, thus frequently shortening the time required for the preparation of the finished product in the nitration or esterification plant. This method of carrying out my invention is rendered possible because of the fact that the action of the ammonia or other basic agent does not continue indefinitely but reaches a final state of equilibrium beyond which no further substantial reduction of viscosity takes place. The user of the nitrated cotton or other cellulose ester thus receives a product having a definite standardized viscosity when dissolved in an appropriate solvent. This is of great advantage since heretofore it has been difficult, or well night impossible for the user of nitrated cotton to procure from the nitration plant a nitrated cotton of uniform quality which will always give substantially the same viscosity when dissolved in suitable solvents in the particular concentration which the user desires. In other words the application of the present invention frequently results in a very important standardization of product which it has hitherto been almost impossible or impracticable to obtain.

While it is true that within practical limits it is possible to control to some extent the viscosity of solutions of cellulose esters by the degree and manner of esterfication, such a method has a deleterious effect upon the film forming properties of the resulting ester, and also upon the strength of film, coated product, etc. and in addition materially reduces the yield of such cellulose esters so treated or prepared.

The present invention provides a pyroxylin solution which does not possess any of these disadvantages and provides also a convenient method of making and utilizing the same.

These desirable results are attained as previously mentioned by subjecting the cellulose ester (either before, during, or after treatment with the solvent) to the action of a basic substance, preferably under regulated conditions whereby the viscosity or consistency or coating properties of the pyroxylin are favorably effected without producing any objectionable decrease in the strength, flexibility or other desirable properties of the films, coated products and other articles which may later be prepared from the pyroxylin.

Since pyroxylin solutions are, in general, incompatible with water, it is advisable, in the practice of my invention, to add the alkaline substance to the cellulose ester in a more or less anhydrous state. So also, if, in accordance with my invention, the cellulose ester is treated with an alkaline or basic substance before subjecting it to the action of an organic solvent, it will then be found advisable to employ the basic substance in a substantially dry or anhydrous condition, such as ammoniated alcohol for example, or if the cellulose ester is treated with an aqueous or hydrous reagent before solution in accordance with my invention, then it will be necessary to remove the water either by air drying or any of the accepted and known methods of dehydration.

Furthermore, while any ordinary basic substance will bring about this desirable reduction in viscosity when employed in suitable amounts and under suitable conditions, yet I prefer to use a basic substance which is not too strong and which is also readily soluble in the pyroxylin or which can readily be removed by evaporation, filtration or otherwise so as to give a substantially homogeneous, transparent, or translucent pyroxylin solution or film or other finished product whenever same is required.

Likewise the complete removal or neutralization of the basic substance is desirable when its presence would unfavorably affect the properties of the finished product as for example when coloring matter or other ingredients are present which are sensitive to basic materials. Once the reduction has taken place such neutralization does not affect the viscosity of the solution.

The following examples will serve to illustrate various embodiments of my invention both as to process and product, but it will be understood that the invention is not restricted to these examples, since various changes may be made therein in accordance with the general principles of my invention and without departing from the scope thereof as set forth in the appended claims.

Example 1

32.0 pounds of nitrated cotton (prepared according to the usual and well-known methods for producing a pyroxylin cotton and containing for example about 12% nitrogen) is dissolved in a mixed solvent containing 102.6 pounds of denatured alcohol, 52.0 pounds of ethyl acetate and 7.6 pounds of acetone, after which 4.0 pounds of castor oil is added and thoroughly mixed in about 7/8 pounds of bicarbonate of soda is then added to the mixture which is then placed in a barrel-type mixer and "tumbled" for from 10 days to about 2 weeks. The resulting cellulose ester solution has a viscosity of about 6 seconds as determined by the "metal-ball" viscosimeter using a steel ball of about 1/4 inch diameter and weighing between about 1.035 and 1.045 grams, and allowing the ball to fall thru a 10 inch column of the cellulose ester solution contained in a glass tube about 15 inches long and about 1½ inches in diameter, the temperature being about 23° C. That is to say, the viscosity is such that it requires about 6 seconds for the steel ball as above specified to fall vertically thru the column of solution the specified distance (10 inches), the container, or cylinder, being as specified.

As compared with the cellulose ester solution made up in the usual way and containing the above ingredients in the above specified proportions but containing no sodium bicarbonate, the improved cellulose ester solution of the present example has a viscosity of only about 1/7 to 1/8 that of a corresponding cellulose ester solution prepared in the same way and having the same composition except as to the sodium bicarbonate.

Example 2

9.7 pounds of zinc oxide is substituted for the 7/8 pounds of sodium bicarbonate in the formula given in Example 1, the remaining constituents being exactly the same as in Example 1, and the mixing being carried out in the same way, and for approximately the same length of time. The product so obtained has a viscosity (as determined by the method described in Example 1) of about 13 seconds as compared with a viscosity of about 16 seconds of a corresponding solution made in the ordinary way without the use of zinc oxide, the other ingredients and the method of mixing and the time being otherwise the same.

Films, threads and coatings made from the pyroxylin of the present invention by means of zinc oxide have substantially the same strength as similar films and coatings prepared without the zinc oxide from the corresponding pyroxylin solution prepared in the same way with the same ingredients except as to the zinc oxide. If a clear solution or a clear film, thread or coating is desired the zinc oxide may be filtered off from the pyroxylin solution by any convenient method.

Example 3

Substitute 9.7 pounds of calcium carbonate for the 7/8 pounds of sodium bicarbonate in the formula as specified in Example 1 and follow the same procedure and method as to the manner of mixing the remaining ingredients and also as to the time of treatment and the temperature and all other conditions specified in Example 1. The coated products obtained from the pyroxylin solution of the present example have about the same strength and other physical properties as similar products prepared from the improved pyroxylin obtained in accordance with Example 2. If a clear solution or a clear coated product is desired the calcium carbonate may be filtered off from the pyroxylin solution by any suitable method.

Example 4

Prepare a pyroxylin solution from the ingredients listed below in the proportions specified, using a barrel-type mixer for mixing and dissolving the nitrated cotton in the solvents and tumbling the mixture for about 8 days: 32.0 pounds of nitrated cotton; 102.6 pounds of denatured alcohol; 48.1 pounds of ethyl acetate; 7.6 pounds of acetone and 3.9 pounds of ammoniated ethyl acetate containing approximately 3% by weight of dissolved anhydrous ammonia gas ($NH_3$).

The ammoniated ethyl acetate is added to the remaining solvents before the nitrated cotton is dissolved therein.

The resulting pyroxylin solution prepared as specified above in this example contains approximately 22 oz. of nitrated cotton per gallon of pyroxylin and has a viscosity of about 11 seconds as determined by the method and means described in Example 1.

Films, threads, coatings, etc., prepared from the pyroxylin of the present example by means of dissolved gaseous ammonia are substantially as good as similar coated products prepared in the usual way from the same ingredients without the use of ammonia.

The pyroxylin solution of the present example is also useful as a lacquer or varnish and when used for this purpose other suitable ingredients such as are ordinarily used in lacquers may be incorporated in the solution prior to coating or lacquering objects therewith.

Example 5

Proceed as in Example 4 using 46.5 lbs. of nitrated cotton instead of 32 pounds, substituting also 20.9 pounds of ammoniated ethyl acetate for the 3.9 pounds used in Example 4, and 31.1 pounds of ordinary ethyl acetate for the 48.1 pounds used in Example 4, the procedure and ingredients being otherwise the same as in Example 4.

The pyroxylin solution so obtained has a viscosity of about 12 seconds as determined by the method and means described in Example 1.

Example 6

Follow the procedure as specified in Example 4, except continue the mixing or tumbling for two or three days instead of eight days, using the following ingredients in the proportions which are indicated: 64. pounds of nitrated cotton; 92.6 pounds of denatured alcohol; 52.0 pounds of ethyl acetate; and 10.0 pounds of denatured alcohol saturated with caustic soda. The resulting pyroxylin solution contains about 44 ounces of nitrated cotton per gallon, and yet this solution is fairly fluid, having a consistency or viscosity equal to about that of a thin syrup. As compared with the viscosity of a corresponding solution made up from the same ingredients in exactly the same way without the use of caustic soda (or similar reagent) the viscosity of the improved pyroxylin solution of the present example is very much less. Since the viscosity of an ordinary 44 oz. pyroxylin solution is such that it flows with great difficulty, or scarcely at all, at ordinary temperatures.

Example 7

About 32.0 pounds of ordinary dried nitro cellulose is immersed in an aqueous solution of ammonia of about 16° Bé. density and allowed to stand for about 15 hours and is then washed free of all traces of ammonia and dried at a temperature of 95° C. This dried nitro cellulose is then dissolved in the usual manner in a solvent mixture consisting of about 102.6 pounds of denatured alcohol; 52.0 pounds of ethyl acetate; and 7.6 pounds of acetone. The resulting solution has a viscosity of about 6 seconds, as determined by the method and means specified in Example 1, whereas a corresponding pyroxylin solution prepared without treating with aqueous ammonia (or a similar reagent) ordinarily has a viscosity of about 40 seconds, as determined in the same way.

Films, fibers, coatings, etc., made from the improved low viscosity pyroxylin of the present example, have a strength and other desirable physical properties comparable with similar products prepared from ordinary pyroxylin prepared in the ordinary method.

Example 8

Dissolve about 32.0 pounds of ordinary nitrated cotton in a mixture consisting of 102.6 pounds of denatured alcohol; 51.0 pounds of ethyl acetate; 7.6 pounds of acetone; and 1.0 pounds of diethylamine. The diethylamine is preferably added to the solvents before dissolving the nitrated cotton therein. The diethylamine is soluble in the solvent mixture and also in the final solution, so that the pyroxylin obtained is perfectly clear, as are also any films, fibers, coatings, etc., prepared by the removal of the solvent. The pyroxylin solution containing the diethylamine is mixed or "tumbled" for about one day, after which time there is no further substantial reduction in the viscosity of the resulting solution caused by the diethylamine. The improved pyroxylin solution of the present example has a viscosity of about 6 seconds as determined by the method and means described in Example 1, whereas the corresponding pyroxylin solution prepared without the use of the amine according to the usual methods, has a viscosity of about 90 seconds.

Example 9

Dissolve 32 pounds of ordinary nitrated cotton in a mixed solvent consisting of about 72.7 pounds of benzol; 80.8 pounds of ordinary ethyl acetate; and 8.1 pounds of ammoniated ethyl acetate, containing about 3% of dissolved anhydrous gaseous ammonia. After the cotton has been added to the mixed solvents containing the ammonia, the solution is mixed or "tumbled", as in Example 1, for about four days, at the end of which time the resulting pyroxylin solution has a viscosity of about 225 seconds as determined by the method and means described in Example 1, whereas the viscosity of a corresponding pyroxylin solution prepared in the usual way, without the use of ammonia, is about 354 seconds determined in the same way.

Example 10

Dissolve about 37.5 pounds of ordinary cellulose acetate in a mixed solvent consisting of about 148.7 pounds of acetone; 15.0 pounds of denatured alcohol; containing also about 1.66 pounds of diethylamine, and continually mix by "tumbling" for about two days. The resulting cellulose acetate solution has a viscosity of about 13 seconds, as determined by the method and means described in Example 1, whereas a corresponding cellulose acetate solution prepared in the ordinary manner, without the diethylamine has a viscosity of about 18 seconds.

Example 11

Dissolve about 33.3 pounds of ordinary cellulose acetate in a mixed solvent consisting of about 116.6 pounds of acetone; 16.6 pounds of denatured alcohol; and 16.6 pounds of ammoniated ethyl acetate containing about 3% of dissolved anhydrous gaseous ammonia. After the cellulose acetate has become completely dissolved, continue the mixing by "tumbling" for about three days. The resulting solution of cellulose acetate has a viscosity of about 7 seconds, as determined by the method and means described in Example 1, whereas a corresponding cellulose acetate solution prepared without the use of ammonia, in accordance with the usual methods, has a viscosity of about 8 seconds.

*Example 12*

Mix about 32.0 pounds of ordinary pyro cotton nitrated cotton with a mixed solvent consisting of about 102.6 pounds of denatured alcohol; 46.8 pounds of ordinary ethyl acetate; 7.6 pounds of acetone; and about 5.2 pounds of ammoniated ethyl acetate containing about 3%, by weight, of dissolved anhydrous gaseous ammonia. Continue the mixing of the above ingredients for about eight days by "tumbling" as in Example 1. The resulting pyroxylin solution has a viscosity of about 220 seconds, whereas a corresponding mixture prepared without the use of ammonia, or any similar reagent, is too viscous for the viscosity to be determined at all by the method referred to.

The pyroxylin solution of the present example is fairly clear but has the appearance sometimes referred to by those skilled in the art as "grizzly".

The cellulose ester solutions, prepared in accordance with Examples 1, 2 and 3, as well as films, fibres, threads, coatings, (artificial leather, lacquer and varnish coatings, etc.,) and similar products prepared therefrom by removal of solvent are somewhat cloudy due to the presence of undissolved particles of the basic reagent used for reducing the viscosity of the respective cellulose ester solution. If clear products are desired in these cases the insoluble material referred to may be filtered off from the cellulose ester solution by any suitable means. The products of the remaining examples are clear as first prepared.

Notwithstanding the relatively very large reduction in viscosity of cellulose ester solutions produced in accordance with my invention by means of a basic reagent, I find that the desirable physical properties such as strength, toughness, flexibility, etc., of films, fibres, and coatings produced from the cellulose ester solutions obtained in the foregoing examples (by removal of the solvent) are substantially as satisfactory as those of similar products prepared in the usual way from standard cellulose ester solutions of corresponding concentrations but having much higher viscosities. These physical properties, however, are not entirely identical in the products produced from the different cellulose ester solutions of the various examples but vary with the amount of basic reagent used, its chemical nature and its solubility in the cellulose ester solution and with other factors, such as time of treatment, temperature, and degree of mixers.

Also I find that the speed at which the viscosity of a given cellulose ester solution is reduced in accordance with my invention depends mainly upon these same factors. Thus I find that the speed of reduction of viscosity is much greater with a basic reagent which is relatively more soluble in the cellulose ester solution than it is with the same proportion of a relatively less soluble reagent, other conditions being substantially the same, and I find also that the reagents which are generally considered stronger bases in a chemical sense reduce the viscosity much more rapidly than weaker bases under otherwise the same conditions. Furthermore, I find that an increase in temperature increases the speed of reduction of viscosity to a remarkable degree and that thorough mixing also favors rapid reduction of viscosity.

Temperatures above the boiling point of the solvents used may be employed by carrying out the treatment in a suitable closed receptacle under pressure.

Of the reagents mentioned in the various examples above, calcium carbonate and zinc oxide are comparable with bicarbonate as to solubility (in the cellulose ester solution) but zinc oxide is somewhat more reactive as a basic substance than calcium carbonate and is also somewhat more soluble. Of the remaining reagents diethylamine is more reactive as a basic material than ammonia and also is very readily soluble in the cellulose ester solution. Caustic soda is a very reactive basic substance and is also fairly readily soluble in the cellulose ester solution but not so readily soluble as ammonia or as diethylamine in certain cellulose ester solvents. The relative effects of these various reagents upon cellulose ester solutions and upon the products produced therefrom are, I have found, substantially in accordance with the general rules outlined above.

The basic reagent which I prefer to use is ammonia because it is anhydrous, very soluble in the usual cellulose ester solvents, may readily be removed from the cellulose ester solution and other products by volatilization, is readily obtainable in pure condition and of uniform quality, is easy to handle, imparts no color or cloudiness to the cellulose ester products and is abundant and sufficiently cheap.

I have found that, the strength, flexibility, toughness, uniformity and other desirable properties of films, fibres, coatings, etc., obtained by removal of solvent from the treated cellulose ester solutions, are usually better when the viscosity is not reduced too low in any given instance, in accordance with my invention, particularly when the concentration of cellulose ester present in the solution is relatively low. Thus, for example, I have found that although a reduction of viscosity down to a value corresponding at least to ⅕ of the original viscosity of the cellulose nitrate solution containing about 30 ozs. or more of cotton per gallon may be produced by treatment with ammonia in accordance with my invention without objectionably weakening the films, fibres, coatings, etc., produced therefrom by the usual methods, nevertheless a further reduction, if very much below this range, frequently causes deterioration in the quality of the final products referred to. With more dilute celluose nitrate solutions the viscosity cannot ordinarily be satisfactorily reduced as far as with stronger solutions.

While rapid reduction of viscosity is desirable from an economic standpoint, I find that if the viscosity is reduced too rapidly, particularly by making use of a chemically very reactive base, the strength and other desirable physical properties of the final films, fibres, coatings, etc., are sometimes adversely effected and I prefer on this account to regulate the speed of reduction of viscosity by the means indicated above in such way that the rate of reduction of viscosity does not rise above this danger zone. Also I prefer to stir or mix the basic reagent and the cellulose ester solution very thoroughly during the treatment since this tends to produce a stronger and more uniform, and otherwise more desirable film, fibre or coating.

I claim:

1. The method of preparing a cellulose ester solution from a cellulose ester and an organic solvent which comprises subjecting the cellulose ester to the action of ammonia in an amount corresponding to about a fraction of one per cent. of the organic solvent to bring about a decrease in the viscosity of the solution.

2. The method of preparing a pyroxylin solution from nitrated cellulose and an organic solvent which comprises subjecting the nitrated cellulose to the action of ammonia in an amount corresponding to about a fraction of one percent. of the organic solvent to bring about a decrease in the viscosity of the pyroxylin solution.

3. The method of preparing a cellulose acetate solution from cellulose acetate and an organic solvent which comprises subjecting the cellulose acetate to the action of ammonia in an amount corresponding to about a fraction of one per cent. of the organic solvent to bring about a decrease in the viscosity of the acetate solution.

4. The method of preparing a cellulose ester solution from a cellulose ester and an organic solvent which comprises subjecting the cellulose ester to the action of an organic solvent containing less than about one per cent. of moisture and an amount of a basic substance equivalent in its thinning effect on the cellulose ester solution to a fraction of a per cent. of ammonia calculated on the total weight of the solvent.

In testimony whereof I affix my signature.

JACOB KLEINHAUS WEIDIG.